Patented Feb. 6, 1934

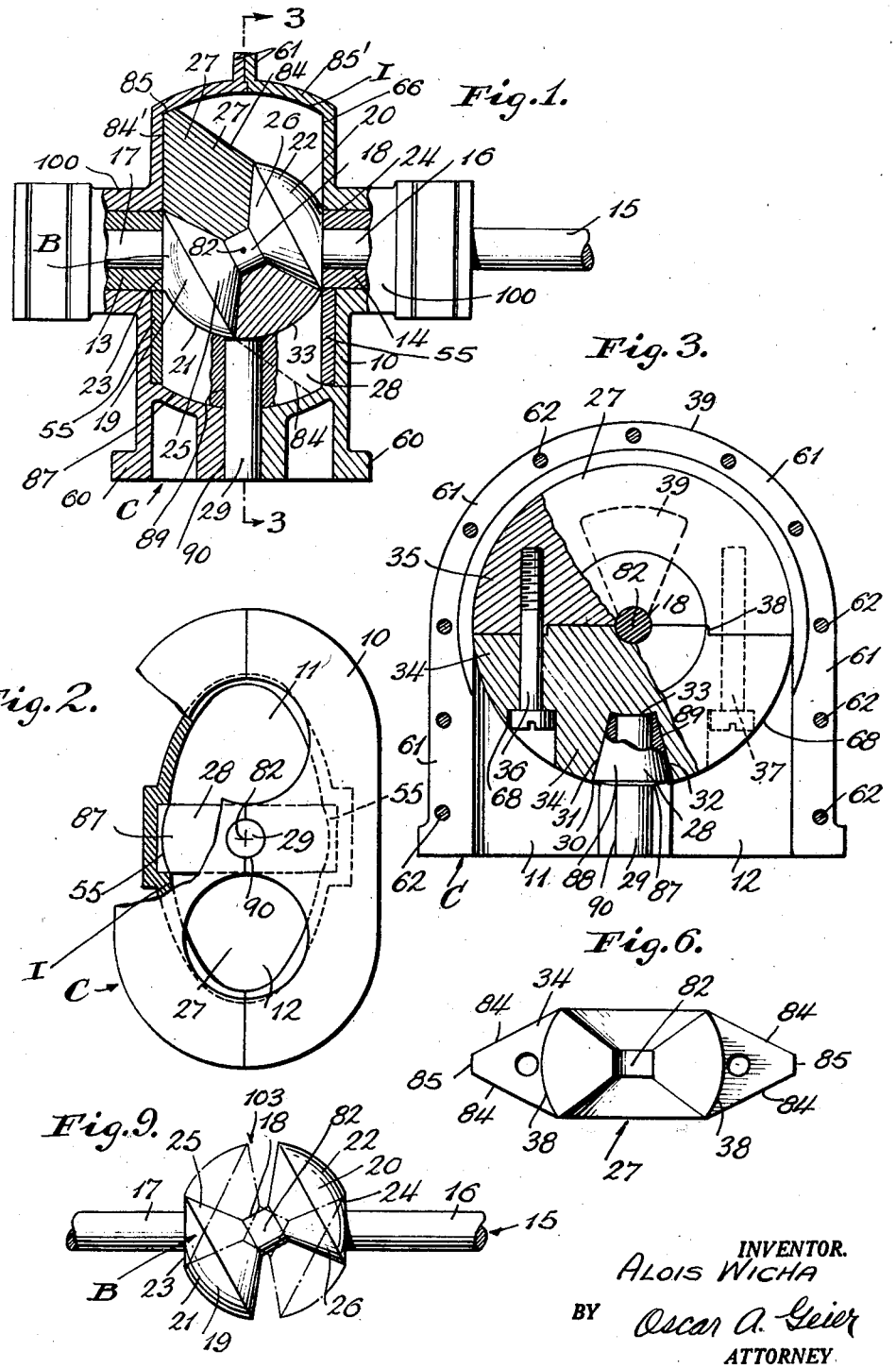

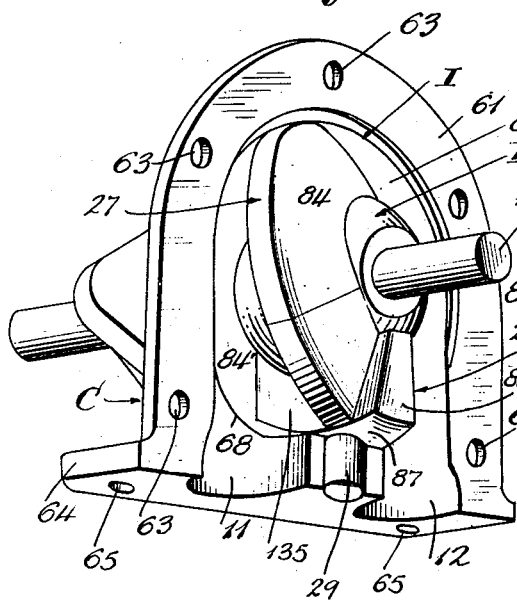
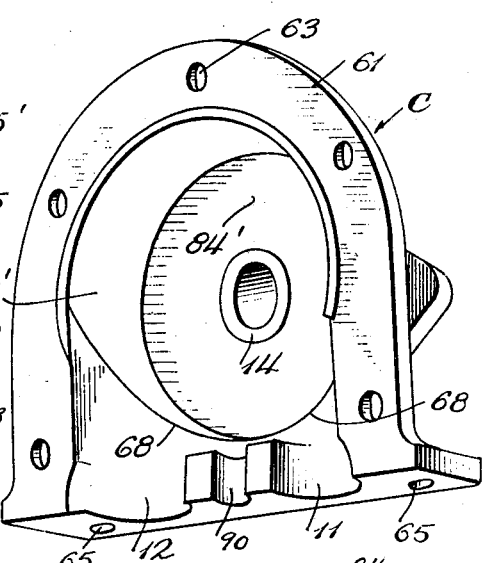
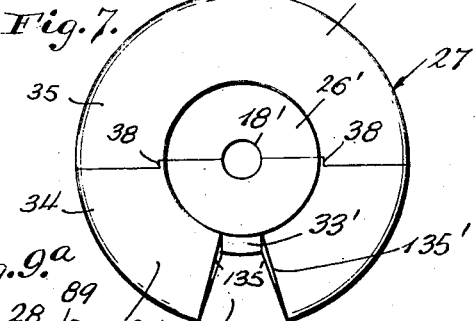
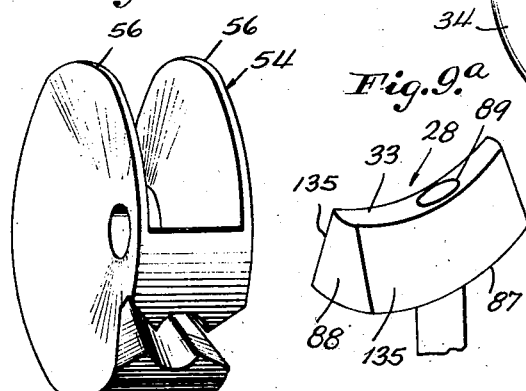
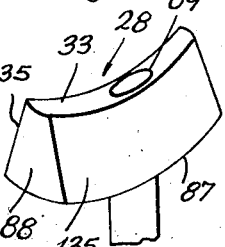
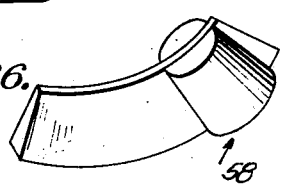
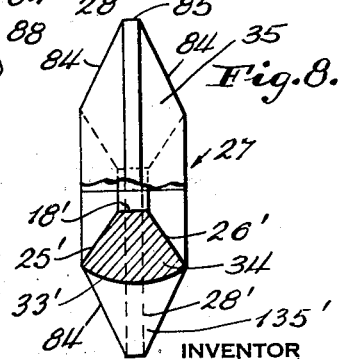

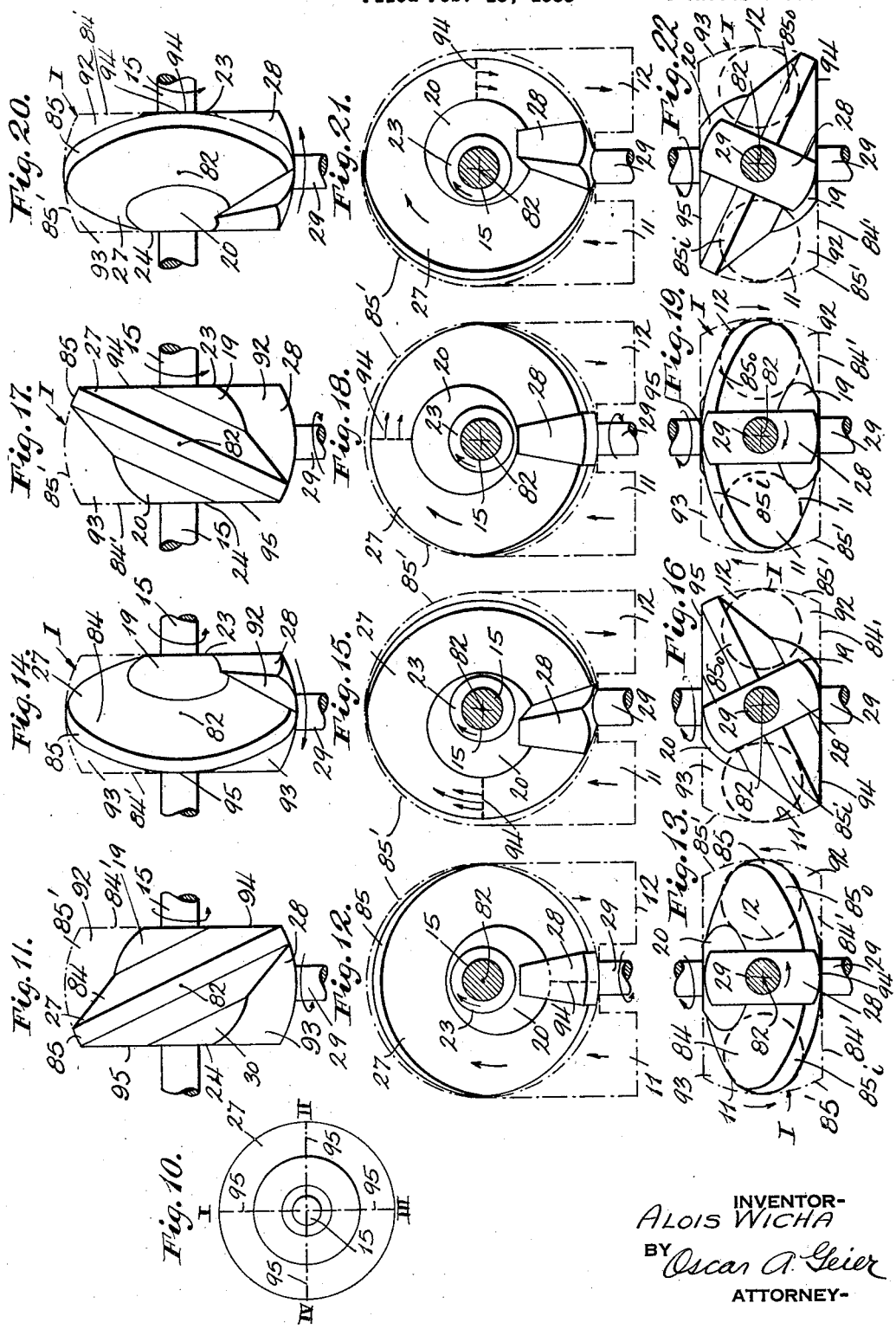

1,946,343

UNITED STATES PATENT OFFICE 1,946,343

FLUID ACTUATOR AND PUMP

Alois Wicha, Dresden, Germany, assignor to Erospha, Inc., Brooklyn, N. Y., a corporation of New York Application February 13, 1933. Serial No. 656,639

19 Claims. (Cl. 103—133)

This invention relates to fluid actuating devices and particularly relates to pumps for liquids and gases and to compressors for gases and vapors and other similar apparatus.

Although the present invention will be particularly described in connection with liquid pumps, it is to be understood that it may also be employed with spherical engines or similar apparatus where a fluid or liquid is passed into a casing, resulting in a shaft or mechanism being actuated.

An object of the present invention is to provide a fluid actuating device or durable pump which may be operated directly from a rotating shaft to give a continuous feed and/or to exert a continuous suction, which will be compact, light in weight and relatively inexpensive and which will have very few parts and not require costly lubricating installations or be readily subject to disadjustments.

Among the other objects of the present invention are to provide a fluid actuating device or pump, which, although it is directly driven from a rotating shaft, has a very high mechanical efficiency and will have a metering action; which may be driven over a wide range of rotational speeds; which will be devoid of valves; which may be readily reversed; and which will produce both a substantially continuous suction at its inlet and a substantially continuous pressure at its outlet, all without the use of complicated or auxiliary mechanical apparatus, such as air bells, resilient diaphragm devices, and so forth.

Other objects will be sufficiently obvious and will appear during the course of the following specification.

In accomplishing the objects above stated the applicant has devised an altogether novel type of pump consisting of a casing, the interior chamber of which may take the form of a spherical section or segment with a peripheral spherical surface and flat or conical side walls; an oscillating impeller disc, the oscillating movement of which takes place both horizontally and vertically within said casing about a fixed center; a drive shaft which has an eccentric driving bearing for the impeller disc causing said impeller to undergo said movement within the casing resulting in substantially continuous movement of fluid from the inlet to the outlet; and a guide member mounted in said casing and received in a slot or socket in one edge of the impeller disc preventing the impeller disc from rotating while permitting relative pivotal and sliding movement whereby said impeller will partake of said oscillating movement both laterally and vertically.

The impeller disc, the sides of which may be flat or outwardly converging or diverging, conforms to the spherical interior surface of the interior chamber along its entire periphery and diametrically oppositely converges toward and diverges from said walls thereof. As a result the interior chamber will be symmetrically divided into two compartments which will be separated from each other by the impeller. The oscillating movement of the disc will continuously rotate these compartments within the casing.

The guide member is positioned between the inlet and outlet ports of the pump and constructed or associated with other elements, so as to prevent direct communication therebetween. As the compartments pass across the guide member, they will be divided thereby. During this passage they will decrease in volume on the approach or outlet side of the guide member, compressing and/or expelling fluid through the outlet port; and at the same time they will increase in volume on the removal or inlet side of the guide member, sucking fluid in through the inlet port.

In pumps of the character described, however, due to the fact that large surfaces of the oscillatory disc slide in contact with the rotary shaft bearings, considerable friction will arise in the course of operation, tending to hinder effective operation of the pump. These relatively large frictional forces will often be unbalanced in such a way as to cause uneven stresses or unbalanced forces tending to jam, cock or otherwise cause rapid wear and break-down of the apparatus.

It is, therefore, a particular object of the present invention to so construct the contact area between the shaft and the impeller disc, that a minimum of friction forces will be generated and so that there will be no substantial amount of stress tending to cock, jam or otherwise unevenly unload either the impeller disc or the shaft during operation.

In accomplishing this last-mentioned object, it has been found most satisfactory to cause the bearing contact surfaces between the impeller disc and the shaft to converge toward the center point of the casing.

The above and other objects will appear more clearly from the following detailed description, when taken in connection with the accompanying drawings, which illustrate a preferred embodiment of the inventive idea.

In the drawings:

Figs. 1 to 5 show one type of pump construction; Fig. 1 being a vertical central and axial sectional view; Fig. 2 being a bottom view in fragmentary section; Fig. 3 being a side sectional view on the line 3—3 of Fig. 1; and Figs. 4 and 5 being perspective views of the pump with the casing opened and showing the impeller disc and guide member in position;

Figs. 6 to 9 are detailed views of the various elements of the pump, Fig. 6 being a top view of the lower half section of the impeller disc; Figs. 7 and 8 being side elevations of the impeller disc, with Fig. 8 in fragmentary section; Fig. 9 being a side elevational view of the shaft; and Fig. 9a being a perspective view of the guide element;

Figs. 10 to 22 are diagrammatic views illustrating the operation of the fluid actuating assembly or pump of Figs. 1 to 5.

Figs. 24 to 26 show another embodiment, Fig. 24 being a vertical, central and axial sectional view; Fig. 25 being a perspective view of the impeller disc removed from the assembly; and Fig. 26 being a perspective view of the guide also removed from the assembly.

Figure 23:
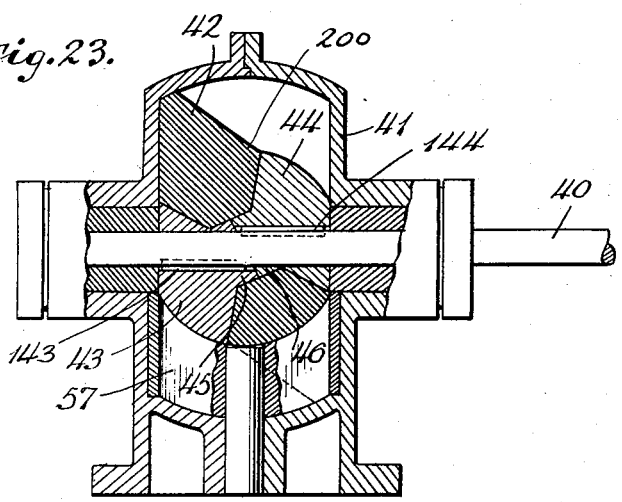
Fig. 23 is a side sectional view of a modified construction showing a slightly different assembly.

The pump or fluid actuating device shown in Figs. 1 to 5 of the drawings is provided with a casing C having an interior pumping chamber I, a main shaft 15, impeller disc 27 and the guide member 28.

The casing is formed of two half sections 60, each of which sections has the contacting integral flanges 61 connected by the bolts 62 (see particularly Fig. 1) passing through the openings 63 (see particularly Figs. 1, 3, 4 and 5). The bottom of the casing is provided with a flange 64 also provided with openings 65, by which the casing may be attached to a suitable support.

The inlet ports 11 and 12 are formed one half in each half section 60, and upon closure of the casing the complete ports are formed, as indicated in Fig. 2.

The interior I of the casing C takes the form of a cylindrical section having flat side walls 84' and a peripheral spherical surface wall 85'. The inlet ports 11 and 12 intersect said spherical surface 85' to form elongated inlet and outlet openings in the bottom portion of the interior I, as indicated at 68 in Figs. 3, 4, and 5.

As shown in Fig. 1, the sides of the casing C are provided with bosses 100 having central openings into which are fitted the bearing sleeves 13 and 14. The bearing sleeves 13 and 14 receive the bearing ends 16 and 17 of the shaft 15 (see also Fig. 9.)

As shown in Figs. 1 and 9, the shaft 15 carries a ball member extending between and contacting with the side walls 84' of the casing C. The ball member is provided with a central oblique slot 103 (see Fig. 9), which receives the impeller disc 27. The sides 25 and 26 of the slot converge toward the fixed center point 82 of the pump. The slot will divide the ball element B into two spherical conical sections 19 and 20, which are symmetrically arranged on opposite sides of the center point 82. The slot 103 will terminate short of the center point 82 in an oblique cylindrical bearing element 18 which also turns about said fixed center point 82. Upon rotation of the eccentric oblique bearing element 18, its axis will describe two horizontal conical sections which meet at the center point 82.

The spherical conical sections 19 and 20 of the shaft 15 (see Figs. 1, 4 and 9) have the spherical bearing surfaces 21 and 22 which contact with the guide element 28, and the transverse flat bearing surfaces 23 and 24 which contact with the side walls 84' of the casing.

In Fig. 5 the solid lines show the shaft removed from the casing and in the position of Fig. 1, while the broken lines indicate the position of the shaft after it has been rotated through an angle of 180°.

The conical surfaces 25 and 26 of the shaft converge toward the center point 82, but terminate short of such point in the oblique cylindrical element 18.

Impeller disc 27 is shown inside of the casing in Figs. 1 to 4 and removed from the casing in Figs. 6, 7 and 8.

The impeller disc 27 is provided with two outwardly converging truncated or frusto-conical propelling surfaces 84 forming the sides of the disc. The edge of the disc takes the form of spherical surface 85 which closely contacts with the inner periphery 85' of the casing. As shown in Figs. 6, 7 and 8, the impeller disc 27 is provided with the bearing surfaces 18', 25' and 26', which bear upon and contact with the correspondingly numbered surfaces on the shaft (see particularly Fig. 9).

This guide member 28, which with the eccentric slot 103 controls the lateral oscillation of the impeller 27, is held and bears within the slot 28', in the impeller disc. The guide member 28 (see Figs. 1, 3 and 9a) takes the form of a fragmentary spherical segment and has inwardly converging side walls 135 which contact with the side walls 135' of the slot 28' (Figs. 7 and 8).

The cylindrical side surfaces 88 of the guide member (see Figs. 2, 3 and 9a) contact closely with the side walls 84' of the chamber I of the casing C and prevent any communication from the inlet to the outlet across the top of said chamber. Preferably, the side walls of the chamber I are provided with recessed bearing elements 55 to receive the ends of guide 28, so that there will be a surface instead of a linear contact (see Figs. 1 and 2).

As shown best in Figs. 1 and 3, the spherical exterior surface 87 of the guide 28 closely contacts with the periphery 85' of the chamber I, while the inner spherical surface 33 contacts both with the correspondingly shaped surface 33' at the bottom of the slot of the impeller disc and with the spherical surfaces 21 and 22 on the shaft 15. The lateral faces 135 of the guide converge toward the center point 82 of the casing C and of the shaft 15.

The guide member is provided with a central opening 89 (see Figs. 1, 3 and 9a) into which projects the pivot stud 29. The stud 29 is fixed at its lower end into the recess 90 in the casing C.

In view of the convergence of the contacting bearing surfaces 25 and 25' and 26 and 26' of the shaft 15 and the impeller disc 27 toward the center point 82, the forces transmitted from the impeller 27 to the shaft 15 and vice versa will be directed at right angles to these sliding surfaces and will have no components directly transversely to the eccentric cylindrical element 18 at the bottom of the slot 103 tending to break said element from its connection with the spherical conical sections 19 and 20.

The piston 27 shown in Figs. 3, 6 and 7 of the drawings consists of two halves 34 and 35 which are connected together by the screws 36 and 37. As shown in Figs. 6 and 7, each of the two impeller halves 34 and 35 are provided with interlocking cylindrical surfaces 38 which take up part of the strain and diminish the stress on the screws 36 and 37.

The impeller half section 35 not containing the guide slot 28' is hollowed, or part of the metal thereof is removed, as indicated at 39. This serves to balance the impeller halves 34 and 35 and as a result the center of gravity of the disc will coincide with the center point 82.

The operation of the pump is most conveniently shown from the diagrammatic views, Figs. 10 to 22. Fig. 10 diagrammatically illustrates the turning of the impeller disc 27 and Figs. 11 to 22 show side, front and bottom views of the impeller disc 27 and the guide member 28 in each of the positions I, II, III and IV designated in Fig. 10.

Figs. 11, 12 and 13, are, respectively, side, front and bottom views of the impeller 27 and guide member 28 in position I; Figs. 14, 15 and 16 are corresponding views in position II; Figs. 17, 18 and 19 are corresponding views in position III; and Figs. 21, 22 and 23 are corresponding views in position IV.

When the shaft 15 rotates, the impeller 27 will be caused to sweep backwardly and forwardly both horizontally and vertically in the interior chamber I with the result that said impeller disc will partake of a rolling oscillation.

At the same time the axes about which the impeller tends to swing will also tend to rotate about the fixed common center point 82 of the casing, impeller and the shaft. The horizontal axis of the impeller will swing in a horizontal plane and the vertical axis will swing in a vertical plane. This last-mentioned vertical plane will also tend to rotate or oscillate about the central vertical axis of the casing, as indicated in Figs. 13, 16, 19 and 22.

As a result of this movement all points on the periphery of the impeller 27 removed from the horizontal axis will tend to move along lemniscate curves which become of greater latitude as the point becomes elevated or depressed and removed from the center point 82 so that points at the top and bottom of the disc 27 will move in lemniscate curves of maximum amplitude. These curves will lay a spherical surface described upon a radius equal to the distance of the point from the center point 82. Because of this movement no substantial acceleration or deceleration forces will be exerted upon the mass of the impeller disc, with the result that the abrupt changes in acceleration characteristic of the reciprocating piston pump are altogether eliminated.

As indicated in Figs. 11, 12 and 13, respectively, in side, front and bottom views, the impeller 27 will divide the interior I of the casing C into two compartments 92 and 93 which are symmetrically disposed in respect to the center point 82 of the pump. In Figs. 11, 14, 17 and 20, the compartment 92 is to the right of the impeller, while the compartment 93 is to the left and Fig. 11 below the impeller. In Figs. 12, 15, 18 and 21, the compartment 93 is in front of the impeller 27 while the compartment 92 is to the rear of the impeller. In Figs. 13, 16, 19 and 22 the compartment 93 is above the impeller while the compartment 92 is below the impeller.

It is apparent that these compartments 92 and 93, due to the oscillation movement of the impeller 27, are caused to rotate within the interior chamber I of the casing C.

During rotation, these compartments 92 and 93 are successively opened and closed to the inlet 11 and then to the outlet 12 so that fluid or liquid which is received through the inlet 11 will be carried to the outlet 12. These compartments 92 and 93 will transfer liquid or fluid through the upper half of the casing from the inlet 11 to the outlet 12. Transfer of fluid or liquid reversely from the outlet to the inlet in the lower half of the chamber is prevented by the guide 28.

It will be noted in Figs. 13, 16, 19 and 22 that the compartments 92 and 93 move through the guide, with the guide preventing communication from one side of the compartment to the other as it is moving through said guide.

As shown in Fig. 13 the compartment 93 is moving through and increasing in volume on the left, and is bisected by the guide 28, while in Fig. 16 both compartments are divided by the guide 28. In Fig. 19 only the compartment 92 is divided by the guide 28 and as the compartment moves to the left, its volume also increases to the left of the guide 28, with a corresponding decrease of volume on the right of the guide 28.

As the compartments 92 and 93 move through the guide, therefore, the volume on the outlet side of the guide 28 decreases with the result that the liquid or fluid is then forced or squeezed out through the outlet 12. At the same time the volume of the compartment on the inlet side of the guide increases with the result that liquid is sucked in through the inlet 11 to fill said increasing volume. It will thus be apparent that each compartment 92 and 93 has inlet and outlet portions of progressively changing volume, the volume successively increasing in communication with the inlet 11, the compartment being cut off from the inlet after it has been filled, then achieving communication with the outlet 12 and decreasing in volume while in communication with the outlet until all of the liquid or fluid has then been forced out through said outlet.

The inlet and outlet subdivision of each compartment 92 and 93 in addition to being separated by the guide member 28 are also separated by the convergence between the side of the impeller 27 and the side of the chamber I. This area or line is indicated for the compartment 92 in Figs. 12, 15, 18 and 21 by the dotted line 94 and it rotates within the interior I in the same direction as the shaft. This area or line is also indicated at 94 in Figs. 11, 16, 17 and 22. The corresponding line or area for the compartment 93 is indicated at 95 in Figs. 11, 16, 17 and 22. It will be noticed that the area or line 95 is always symmetrically disposed diametrically opposite to the area or line 94 in respect to the center point 82.

In Figs. 11, 12 and 13 the compartment 92 has just been filled and is being cut off from the inlet 11 by the edge 85i of the impeller 27. And it is also just about to be opened to the outlet 12 by the edge 85o of the impeller 27. The edges 85i and 85o of the impeller, together with areas 94 and 95 function as inlet and outlet valves since they serve to open and cut off the inlet 11 and to open and cut off the outlet 12 to the compartments 92 and 93.

In the position shown in Figs. 11 to 13, the line 94 coincides with the contact of the end surface of the guide element 28 with the side wall 84' of the interior I so that the compartment 92 in this position is not divided nor is it decreased in volume by the volume of the guide. To reach this position the compartment 92 has been increased in volume while in communication with the inlet 11 on the inlet side of the guide 28, with the result that an amount of fluid or liquid equal in amount to the maximum volume of the compartment 92 has been sucked or drawn thereinto.

Then as the shaft 15 continues to move from the position I of Figs. 11 to 13, to the position II of Figs. 14 to 16, the edge 85i of the impeller 27 will swing downwardly across the inlet port to the position indicated in Fig. 16, while the edge 85o will sweep upwardly across the outlet port from the position of Fig. 13 to the position of Fig. 16, opening the entire outlet port 12 to the compartment 92. As this is occurring, the compartment 92 is being moved through the guide 28 so that it is increasing in volume in respect to the inlet 11, liquid or fluid being sucked into the opening portion on the inlet side of the guide up to the line of contact 94 while due to the decreasing volume of the portion of the compartment 92 on the outlet side of the guide 28 a corresponding volume of liquid and fluid is being forced outwardly through said outlet 12.

In the position of Figs. 17 to 19, the compartment 92 is bisected by the guide member 28 and it is open one-half to the inlet 11 and one-half to the outlet 12 with the volume in communication with the inlet increasing while the volume with the outlet is decreasing.

In Figs. 20 to 22 the area has reached the position 94 in Fig. 21. The major portion of the volume of the compartment 92 has been opened to the inlet 11 and with the last portions of liquid contained in said compartment on the outlet side being forced out through said outlet 12.

In Fig. 22 the impeller disc edge 85o is swinging downwardly to cut off the outlet port 12. The inlet edge 85i is also swinging in the same direction to cut off the inlet port 11 after the compartment 92 has been filled and the area 94 has passed the guide element 28.

The compartment 92 is first closed and then opened to the outlet and inlet ports 12 and 11 by the edges 85o and 85i as the area sweeps over said ports.

The operation of the other compartment 93 is obvious from what has been described in connection with compartment 92.

It is therefore evident that as the shaft 15 rotates and the impeller 27 and the guide 28 oscillate, liquid or fluid will be continuously acted upon and moved from the inlet 11 to the outlet 12 by the compartment 92 and 93. It will be noted that the pump is substantially volumetric in action except for a very small amount of leakage across the periphery 85 and across the line 94 and 95, the combined volume of the chambers 92 and 93 being transferred from the inlet to the outlet once for each complete revolution of the shaft 15.

In the modification of Fig. 23 a single cylindrical shaft 40 is provided and extends entirely through the casing 41. The impeller 42 is of one piece, while the eccentric conical members 43 and 44 are made of two separate pieces which are keyed together and to the shaft 40 at 143 and 144. The member 43 is provided with a cylindrical projection 45, while the member 44 is provided with a similar projection 46. Both projections fit together and form the bottom of the slot 200 which carries the impeller 42. The oblique shaft element formed of the projections 45 and 46 is similar in shape and function to the element 18 of the shaft 15 shown in the Figs. 1 and 9. The guide member 57 is similar in construction and function to the guide member 28 of Fig. 1. The pump will function as described in connection with Figs. 10 to 22.

Figure 24:
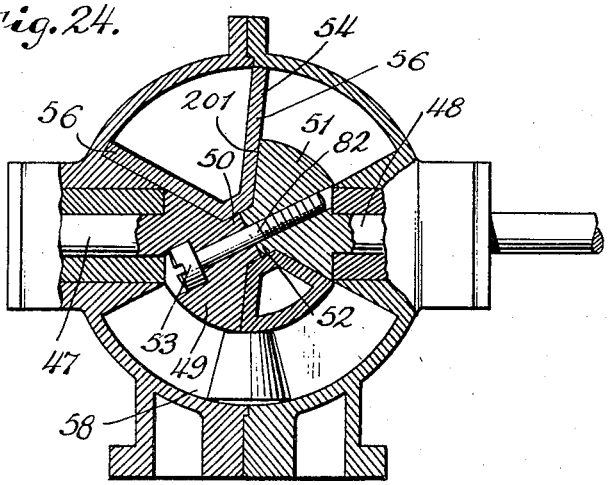

In the modification shown in Figs. 24 to 26 the shaft is made in two parts 47 and 48. The spherical cone member 49 is integral with the shaft end 47 and also with an oblique cylindrical projection 50, while the spherical cone member 51 is integral with the shaft end 48 and the oblique cylindrical projection 52. The members 49 and 51 are connected with each other by a screw 53. When the shaft is assembled the eccentric slot 201 carrying the impeller 54 will be formed, the elements 49 and 51 forming the sides of the slot and the elements 50 and 52 forming the bottom of the slot. The mass of the assembled shaft should preferably be centered at the center point 82 of the pump. The impeller 54 as shown is provided with diverging peripheral walls 56. The impeller 54 and the guide member 58 are shown removed from the assembly in Figs. 25 and 26. The operation of a diverging type impeller of this character is fully described and claimed in my application, Serial No. 656,641, filed February 13, 1933, and the split conical guide is disclosed in my application Serial No. 656,637 filed February 13, 1933, the present application being directed in part to the two-part construction of the shaft.

In considering the operation of the fluid actuating device of the present invention, which operation has been diagrammatically illustrated and described in connection with Figs. 10 to 22, it is to be noted that the impeller 27 in the course of its oscillating movement causes a displacement of fluid both when it moves toward the wall of the casing C and when it moves away from the wall of the casing C. In the former case the fluid is forced out of the casing through the outlet or is forced from one part of the interior chamber of the casing.

Since the entire side wall or side surface of the impeller does not move toward the side wall of the interior chamber simultaneously but rather is caused to move over said surface so that one portion of the side of the impeller is advancing toward the side of the casing, while another portion of the side of the impeller may be moving away from the same side wall of the impeller, it is evident that the oscillating movement of the impeller will result in moving fluid circularly around within the interior of the casing.

It is thus evident that the displacement action of the oscillating impeller of the present invention differs substantially from the displacement action of the piston of a reciprocating pump in that whereas the motion of the reciprocating piston causes a linear movement of fluid to the end of a cylinder, in the device of the present application on the other hand, the displacement action of the impeller causes a rotational movement of the fluid from the inlet to the outlet along the face of the impeller. The guide with its adjuncts extending between the side walls of the chamber I causes the action to draw in fluid from the inlet and to force fluid out through the outlet.

The volume for containing fluid or liquid within the casing of the device will always be substantially constant since it will be equivalent to the volume of the interior chamber minus the volume of the impeller and the volume of the guide with its adjuncts. As previously described, the impeller will divide the chamber into two pumping chambers which, although they are of substantially constant volume throughout operation of the device (except for the volume of the guide or its adjuncts which may project into them) they nevertheless will have portions of varying volumetric capacity in communication with the inlet and outlet, the volume in communication with the inlet increasing while the volume in communication with the outlet is decreasing.

From this point of view it may be considered that the guide is a fixed fluid impelling device which moves relatively through the compartments on opposite sides of the impeller to increase their volume on one side, causing drawing in of liquid from the inlet and to decrease their volume on the other side, causing discharge of liquid through the outlet. This action, however, is quite different from the action of a reciprocating piston pump in which there is a fixed piston and a movable cylinder in that in the present invention the displacement member or the guide member moves continuously through the compartments, one after the other without the abrupt reversals as occur in all reciprocating pumps.

It is apparent from the foregoing description of the operation, that the shaft may be rotated in either direction, and that as a result of such reverse rotation the inlets and outlets will be similarly reversed. The discharge output of the device is proportional to the speed of rotation of the shaft, while the head or height of delivery is independent of the speed of rotation.

The matter shown and described in the present application but not claimed herein is covered in my copending applications Serial Nos. 656,637; 656,638; 656,640; 656,641 and 656,642, filed respectively February 13, 1933; 673,244 and 673,245, filed respectively May 27, 1933 and 696,944, filed November 7, 1933.

The spherical mechanism of the present application may be used as a gas or vapor compressor, as disclosed in my application 656,638, or it may be used as a vacuum pump, as disclosed in my application 656,642.

The peripheral and annular side impelling surfaces of the impeller or piston and the corresponding adjacent surfaces of the interior chamber of the spherical machine of the present application may be provided with a surface or space packing or sealing, as disclosed in my application 696,944.

The separating wall member and the guide member, instead of being positioned together between the inlet and outlet port connections, may be separated with the guide member taking the form of a pin or ball being placed in some other part of the casing than in combination with the separating wall, as shown in my copending applications 673,244 and 673,245.

What is claimed is:

1. In a fluid actuating apparatus, a casing with an interior spherical pumping chamber with inlet and outlet ports, an impeller dividing said chamber into a plurality of compartments, a rotatable driving shaft provided with an oblique slot receiving said impeller, and a guide member preventing rotation of said impeller while permitting it to oscillate to rotate said compartments, whereby it will convey fluid from said inlet port to said outlet port, said slot having centrally converging complemental frusto-conical bearing surfaces opposed to each other, and said impeller having similar surfaces engaging the first-named surfaces, the conical bearing surfaces of said slot being rigidly connected by an oblique cylindrical member having a cylindrical bearing surface and said impeller having a central cylindrical bearing surface engaging said connecting cylindrical bearing surface, said engaging conical bearing surfaces and said cylindrical bearing surface of said slot and the corresponding engaging surface of said impeller closely contacting with each other and forming spaced areas of contact of truncated conical shape connected together by a central cylindrical contact area extending between the portions of the frusto-conical contact areas of smallest diameter, said guiding member and said impeller also having a slotted connection in respect to each other.

2. In a fluid actuating apparatus, a casing with an interior spherical pumping chamber with inlet and outlet ports, an impeller dividing said chamber into a plurality of compartments, a rotatable driving shaft provided with an oblique slot receiving said impeller, and a guide member preventing rotation of said impeller while permitting it to oscillate to rotate said compartments, whereby it will convey fluid from said inlet port to said outlet port, said slot having complemental frusto-conical bearing surfaces opposed to each other, and said impeller having similar surfaces engaging the first-named surfaces, said bearing surfaces converging toward a common point which is coincident with the axis of rotation of said shaft, the conical bearing surfaces of said slot being rigidly connected by an oblique cylindrical member having a cylindrical bearing surface and said impeller having a central cylindrical bearing surface engaging said connecting cylindrical bearing surface, said engaging conical bearing surfaces and said cylindrical bearing surface of said slot and the corresponding engaging surface of said impeller closely contacting with each other and forming spaced areas of contact of truncated conical shape connected together by a central cylindrical contact area extending between the portions of the frusto-conical contact areas of smallest diameter, said guiding member and said impeller also having a slotted connection in respect to each other.

3. In a fluid actuating apparatus, a casing with an interior spherical pumping chamber with inlet and outlet ports, an impeller dividing said chamber into a plurality of compartments, a rotatable driving shaft provided with an oblique slot receiving said impeller, and a guide member preventing rotation of said impeller while permitting it to oscillate to rotate said compartments, whereby it will convey fluid from said inlet port to said outlet port, said slot being formed between two shaft sections, each section having an outer spherical surface and an inner frusto-conical surface, said impeller engaging the conical surfaces of said sections, and said guide member having a spherical bearing surface engaging the spherical surfaces of said sections, the conical bearing surfaces of said slot being rigidly connected by an oblique cylindrical member have a cylindrical bearing surface and said impeller having a central cylindrical bearing surface engaging said connecting cylindrical bearing surface, said engaging conical bearing surfaces and said cylindrical bearing surface of said slot and the corresponding engaging surface of said impeller closely contacting with each other and forming spaced areas of contact of truncated conical shape connected together by a central cylindrical contact area extending between the portions of the frusto-conical contact areas of smallest diameter, said guiding member and said impeller also having a slotted connection in respect to each other.

4. In a fluid actuating apparatus, a casing with an interior spherical pumping chamber with inlet and outlet ports, an impeller dividing said chamber into a plurality of compartments, a rotatable driving shaft provided with an oblique slot receiving said impeller, and a guide member preventing rotation of said impeller while permitting it to oscillate to rotate said compartments, whereby it will convey fluid from said inlet port to said outlet port, said slot being formed between two shaft sections, each section having outer flat and spherical surfaces and an inner frusto-conical surface, the flat surfaces of said sections engaging the walls of said pumping chamber, said impeller engaging the conical surfaces of said sections, and said guide member having a spherical bearing surface engaging the spherical surfaces of said sections, the conical bearing surfaces of said slot being rigidly connected by an oblique cylindrical member having a cylindrical bearing surface and said impeller having a central cylindrical bearing surface engaging said connecting cylindrical bearing surface, said engaging conical bearing surfaces and said cylindrical bearing surface of said slot and the corresponding engaging surface of said impeller closely contacting with each other and forming spaced areas of contact of truncated conical shape connected together by a central cylindrical contact area extending between the portions of the frusto-conical contact areas of smallest diameter, said guiding member and said impeller also having a slotted connection in respect to each other.

5. In a fluid actuating apparatus, a casing with an interior spherical pumping chamber with inlet and outlet ports, an impeller dividing said chamber into a plurality of compartments, a rotatable driving shaft provided with an oblique slot receiving said impeller, and a guide member preventing rotation of said impeller while permitting it to oscillate to rotate said compartments, whereby it will convey fluid from said inlet port to said outlet port, said slot including complemental frusto-conical bearing surfaces opposed to each other, and said impeller having similar surfaces engaging the first named surfaces, said conical surfaces having a common apex coincident with the point of intersection of the horizontal and vertical axes of said impeller, the conical bearing surfaces of said slot being rigidly connected by an oblique cylindrical member having a cylindrical bearing surface and said impeller having a central cylindrical bearing surface engaging said connecting cylindrical bearing surface, said engaging conical bearing surfaces and said cylindrical bearing surface of said slot and the corresponding engaging surface of said impeller closely contacting with each other and forming spaced areas of contact of truncated conical shape connected together by a central cylindrical contact area extending between the portions of the frusto-conical contact areas of smallest diameter, said guiding member and said impeller also having a slotted connection in respect to each other.

6. In a fluid actuating apparatus, a casing with an interior spherical pumping chamber with inlet and outlet ports, an impeller dividing said chamber into a plurality of compartments, a rotatable driving shaft provided with an oblique slot receiving said impeller, and a guide member preventing rotation of said impeller while permitting it to oscillate to rotate said compartments, said impeller being adapted to partake of a pendulum-like lateral oscillation without rotation, whereby it will convey fluid from said inlet port to said outlet port, the mass of the impeller being so arranged that its center of gravity will be coincident with the point of intersection of the horizontal and vertical axes of said impeller, whereby the mass of the impeller will be balanced to substantially eliminate unequal stresses upon its lateral pendulum-like oscillation, said guide member and said impeller also having a slotted connection in respect to each other.

7. In a fluid actuating apparatus, a casing with an interior spherical pumping chamber with inlet and outlet ports, an impeller dividing said chamber into a plurality of compartments, a rotatable driving shaft provided with a solid ball within said chamber, said ball having an oblique slot receiving said impeller, and a guide member preventing rotation of said impeller while permitting it to oscillate to rotate said compartments, whereby it will convey fluid from said inlet port to said outlet port, said slot being formed of two shaft members having complemental frusto-conical bearing surfaces opposed to each other and an adjacent cylindrical surface oblique with respect to the axis of said shaft, said cylindrical surface forming the bottom of said slot and integrally connecting said frusto-conical surfaces and said impeller having conical surfaces engaging the first-named bearing surfaces, the conical bearing surfaces of said slot being rigidly connected by an oblique cylindrical member having a cylindrical bearing surface and said impeller having a central cylindrical bearing surface engaging said connecting cylindrical bearing surface, said engaging conical bearing surfaces and said cylindrical bearing surface of said slot and the corresponding engaging surface of said impeller closely contacting with each other and forming spaced areas of contact of truncated conical shape connected together by a central cylindrical contact area extending between the portions of the frusto-conical contact areas of smallest diameter, said guiding member and said impeller also having a slotted connection in respect to each other.

8. In a fluid actuating apparatus, a casing with an interior spherical pumping chamber with inlet and outlet ports, an impeller dividing said chamber into a plurality of compartments, a rotatable driving shaft provided with an oblique slot receiving said impeller, and a guide member preventing rotation of said impeller while permitting it to oscillate to rotate said compartments, whereby it will convey fluid from said inlet port to said outlet port, said slot being formed by a plurality of shaft members, each of said members having an oblique cylindrical portion and a conical surface, and said impeller having conical surfaces engaging the conical surfaces of said members, the conical bearing surfaces of said slot being rigidly connected by an oblique cylindrical member having a cylindrical bearing surface and said impeller having a central cylindrical bearing surface engaging said connecting cylindrical bearing surface, said engaging conical bearing surfaces and said cylindrical bearing surface of said slot and the corresponding engaging surface of said impeller closely contacting with each other and forming spaced areas of contact of truncated conical shape connected together by a central cylindrical contact area extending between the portions of the frusto-conical contact areas of smallest diameter, said guiding member and said impeller also having a slotted connection in respect to each other.

9. In a fluid actuating apparatus, a casing, with an interior spherical chamber having spaced side walls, a continuous spherical peripheral wall, and inlet and outlet ports opening in one side of said spherical peripheral wall and positioned closely adjacent to each other, a disc-like impeller positioned obliquely in said chamber having its side walls approaching and diverging from the side walls of the chamber to form reversely congruent compartments, a central cam element to actuate said impeller and a guide element to control the motion of said impeller, said guide element fitting in a slot in said impeller and said impeller fitting in a slot in said central cam element, the contacting sliding surfaces of said slots converging toward the center point of the apparatus.

10. A fluid actuating pump having a casing with a spherical pumping chamber provided with separated side walls, a continuous peripheral side wall of spherical contour and inlet and outlet ports opening into said side wall, an impelling device positioned obliquely within said chamber with side walls oppositely diverging from the side walls of the chamber to form reversely congruent wedge-like compartments and with a peripheral spherical edge positioned in close adjuxtaposition to said peripheral wall, and means to control the oscillating movement of said impeller including a guide and a central cam element each having sliding slotted connections with respect to said impeller, the sliding surfaces of said slots converging toward the center point of said pump.

11. In a pumping device, a casing having spaced side walls and a connecting spherical continuous peripheral wall, said peripheral wall being adapted to receive inlet and outlet port means, an obliquely located disc-like impeller member in said chamber which approaches and diverges from the side walls of the chamber of the casing to form a plurality of reversely congruent wedge-like pumping compartments, said impeller being adapted to partake of a pendulum-like lateral oscillation without rotation, said impeller having a spherical peripheral edge located in close adjuxtaposition to the peripheral wall of the chamber, a guide member, one side of said impeller being provided with a slotted guiding connection for said guide member and the other side of said impeller being provided with a cavity, whereby the center of gravity of the impeller will be at the center of the casing, whereby the mass of the impeller will be balanced to substantially eliminate unequal stresses upon its lateral pendulum-like oscillation.

12. In a pumping device, a casing having an interior pumping chamber with spaced side walls and a continuous connecting spherical peripheral wall, said spherical peripheral wall receiving inlet and outlet ports, a disc-like impeller located obliquely within said chamber with a peripheral spherical edge located in close adjuxtaposition to the peripheral wall of the pumping chamber with side walls which oppositely approach and diverge from the side walls of the interior chamber to form a plurality of reversely congruent wedge-like pumping compartments, actuating means to cause said impeller to move over the side walls of said chamber and to oscillate laterally across the peripheral spherical wall of said chamber, a separating wall between the inlet and outlet ports extending into said chamber and received in a slot in said impeller, said impeller being adapted to partake of a pendulum-like lateral oscillation without rotation, said impeller being so constructed that its center of gravity will be at the center point of the device, whereby the mass of the impeller will be balanced to substantially eliminate unequal stresses upon its lateral pendulum-like oscillation.

13. In a pumping device, a casing having an interior pumping chamber with spaced side walls and a continuous connecting spherical peripheral wall, said spherical peripheral wall receiving inlet and outlet ports, a disc-like impeller located obliquely within said chamber with a peripheral spherical edge located in close adjuxtaposition to the peripheral wall of the pumping chamber with side walls which oppositely approach and diverge from the side walls of the interior chamber to form a plurality of reversely congruent wedge-like pumping compartments, actuating and guiding means to cause the side walls of said impeller to move over the side walls of said casing and to cause the peripheral edge of said impeller to oscillate laterally across the peripheral wall of said chamber and during said lateral oscillation to control said inlet and outlet ports, and means to separate said inlet and outlet ports to prevent direct communication therebetween, said actuating means including a pair of oblique spherical cones bolted together within the interior of said chamber to form a wedge-shaped slot receiving said impeller, the sides of said wedge-shaped slot forming a conical bearing contact area with respect to the impeller, the apexes of which cones are coincident with the center point of the device, the adjacent portions of said cones having integral cylindrical extensions which abut each other to form a central cylindrical bearing for the impeller.

14. In a pumping device, a casing having an interior pumping chamber with spaced side walls and a continuous connecting spherical peripheral wall, said spherical peripheral wall receiving inlet and outlet ports, a disc-like impeller located obliquely within said chamber with a peripheral spherical edge located in close adjuxtaposition to the peripheral wall of the pumping chamber with side walls which oppositely approach and diverge from the side walls of the interior chamber to form a plurality of reversely congruent wedge-like pumping compartments, actuating and guiding means to cause the side walls of said impeller to move over the side walls of said casing and to cause the peripheral edge of said impeller to oscillate laterally across the peripheral wall of said chamber and during said lateral oscillation to control said inlet and outlet ports, and means to separate said inlet and outlet ports to prevent direct communication therebetween, said actuating means including a central shaft passing axially through the interior chamber and a pair of obliquely located cones fitting on and keyed to said shaft, said cones forming a wedge-shaped slot receiving said impeller, the sides of said wedge-shaped slot forming a conical bearing contact area with respect to the impeller, the apexes of which cones are coincident with the center point of the device, the adjacent portions of said cones being provided with cylindrical projections which abut each other to correctly position said cones in respect to each other, said cylindrical projections forming a central bearing for said impeller.

15. In a pumping device, a casing having an interior pumping chamber with spaced side walls and a continuous connecting spherical peripheral wall, said spherical peripheral wall receiving inlet and outlet ports, a disc-like impeller located obliquely within said chamber with a peripheral spherical edge located in close adjuxtaposition to the peripheral wall of the pumping chamber with side walls which oppositely approach and diverge from the side walls of the interior chamber to form a plurality of reversely congruent wedge-like pumping compartments, actuating and guiding means to cause the side walls of said impeller to move over the side walls of said casing and to cause the peripheral edge of said impeller to oscillate laterally across the peripheral wall of said chamber and during said lateral oscillation to control said inlet and outlet ports, and means to separate said inlet and outlet ports to prevent direct communication therebetween, said impeller being adapted to partake of a pendulum-like lateral oscillation without rotation, said impeller being formed in two halves, one of which is provided with a cavity so that the center of gravity will be at the center point of the impeller, said slotted portion receiving said guiding means, whereby the mass of the impeller will be balanced to substantially eliminate unequal stresses upon its lateral pendulum-like oscillation.

16. In a fluid actuating apparatus, a casing provided with an interior chamber having peripheral side walls, an impeller therein, means to impart an oscillating movement to said impeller about a fixed center point, said impeller being provided with a transverse slot and an oscillating separating wall member received in said slot, said separating wall member extending between and forming a fluid barrier across the side walls of the casing, the end of said separating wall member and the adjacent portions of said side walls being formed so that the ends of said separating wall member and the adjacent portions of said side walls conform over a substantial area, largely preventing passage of fluid from one side of the side walls to the other side of the side walls.

17. In a fluid actuating apparatus, a casing provided with an interior chamber having peripheral side walls, an impeller therein, means to impart an oscillating movement to said impeller about a fixed center point, said impeller being provided with a transverse slot and an oscillating separating wall member received in said slot, said separating wall member extending between and forming a fluid barrier across the side walls of the casing, the ends of said separating wall member and the adjacent portions of said side walls conforming over a substantial area, largely preventing passage of fluid from one side of the side walls to the other side of the side walls, the ends of said separating wall being of cylindrical contour and the adjacent portions of the side walls being provided with cylindrical recesses to receive the cylindrical ends of the separating wall.

18. In a spherical device, a casing having an interior pumping chamber with spaced side walls and a connecting spherical peripheral wall, said spherical peripheral wall receiving inlet and outlet ports, an impeller located obliquely within said chamber with a peripheral spherical edge located in close adjuxtaposition to the peripheral wall of the pumping chamber with side walls which oppositely converge toward and diverge from the side walls of the interior chamber to form a plurality of reversely congruent wedge-like pumping compartments, actuating and guiding means to cause the side walls of said impeller to move over the side walls of said casing and to cause the peripheral edge of said impeller to oscillate laterally across the peripheral wall of said chamber and during said lateral oscillation to control said inlet and outlet ports, and means to separate said inlet and outlet ports to prevent direct communication therebetween, said impeller being formed in two halves and said halves being provided with registering cylindrical shoulders on their mating faces substantially removed from the center point of the impeller.

19. In a spherical device, a casing having an interior pumping chamber with spaced side walls and a connecting spherical peripheral wall, said spherical peripheral wall receiving inlet and outlet ports, an impeller located obliquely within said chamber with a peripheral spherical edge located in close adjuxtaposition to the peripheral wall of the pumping chamber with side walls which oppositely converge toward and diverge from the side walls of the interior chamber to form a plurality of reversely congruent wedge-like pumping compartments, actuating and guiding means to cause the side walls of the said impeller to move over the side walls of said casing and to cause the peripheral edge of said impeller to oscillate laterally across the peripheral wall of said chamber and during said lateral oscillation to control said inlet and outlet ports, and means to separate said inlet and outlet ports to prevent direct communication therebetween, said impeller being formed in two halves and said halves being provided with registering cylindrical shoulders on their mating faces substantially removed from the center point of the impeller, said impeller halves being secured together by bolts perpendicular to the mating faces, one on each side of the center of said impeller.

ALOIS WICHA.